United States Patent
Wieferig

[15] 3,642,615
[45] Feb. 15, 1972

[54] METHOD AND APPARATUS FOR THE BIOLOGICAL TREATMENT OF WASTE WATER

[72] Inventor: Theodor Wieferig, Vechta/Oldb., Germany
[73] Assignee: Passavant-Werke, Hutte, Germany
[22] Filed: May 22, 1970
[21] Appl. No.: 39,745

[30] Foreign Application Priority Data
Sept. 2, 1969 Germany .......................P 19 44 558.0

[52] U.S. Cl..................................210/7, 210/14, 210/151, 210/195
[51] Int. Cl............................................................C02c 1/10
[58] Field of Search ......................................210/3–8, 14, 15, 210/150, 151, 194–197

[56] References Cited

UNITED STATES PATENTS 3,295,682  1/1967  Schramm..........................210/219 X
3,355,023  11/1967  Foster.....................................210/195
3,385,444  5/1968  Dufournet..............................210/7 X
3,428,555  2/1969  Kitagawa et al........................210/14 X

FOREIGN PATENTS OR APPLICATIONS 804,249  11/1958  Great Britain............................210/15

Primary Examiner—Michael Rogers
Attorney—Larson, Taylor and Hinds

[57] ABSTRACT

A system for active sludge waste water treatment comprises an aerating chamber and a clarifying chamber. Raw water is introduced into the aerating chamber where liquid is circulated in a path in the aerating chamber and the liquid is aerated. A portion of the circulating liquid is conveyed to the clarifying chamber where the sludge settles to the bottom. Settled sludge is conveyed from the bottom of the clarifying chamber and introduced into the aerating chamber in a direction substantially the same as the direction of motion of the liquid in the path of circulation in the clarifying chamber. Clarified water is removed from the top of the clarifier and sludge is withdrawn from the aerating chamber.

12 Claims, 4 Drawing Figures

INVENTORS
THEODOR WIEFERIG

BY Larson and Taylor
ATTORNEYS

INVENTORS
THEODOR WIEFERIG

METHOD AND APPARATUS FOR THE BIOLOGICAL TREATMENT OF WASTE WATER

BACKGROUND OF THE INVENTION

The invention relates to a method and apparatus for biological waste water treatment according to the activated sludge process. In this type of process, waste water is aerated and is mixed with activated sludge in an aeration tank. The aerated liquid is clarified by sedimentation of sludge flocs in a secondary treatment tank. Settled sludge is reintroduced as recycle sludge into the aeration tank through passages which connect the secondary tank and the aeration tank. In treatment tanks of known design, the sludge return passages are provided at the bottom of the tanks and serve to return the sludge having settled in the secondary tank into the aeration tank and also to introduce the aerated sludge water mixture from the aeration tank into the secondary tank. The exchange of both liquid and sludge between the aeration tank and the secondary tank thus takes place in both directions through the same openings located at the bottom. Consequently, the opposed flow patterns interfere with each other, thus causing undesirable turbulences, and the exchange between the tanks is rendered less efficient. A vertically ascending flow is induced in the secondary tank by the sludge water mixture entering the tank at the bottom and this flow opposes and impedes the settling movement of the sludge particles. In particular, air bubbles introduced into the water of the aeration tank by the surface aerator and entering the secondary tank through the passages near the bottom may adhere to the sludge flocs and prevent them from settling.

It is an object of the present invention to avoid the aforementioned disadvantages and to arrange the flow patterns in a waste water treatment plant in such a way as to achieve an optimum exchange between the aeration tank and the secondary tank and in particular an optimum sludge return from the secondary tank into the aeration tank.

BRIEF SUMMARY OF THE INVENTION

The foregoing and other objects which will be apparent to those having ordinary skill in the art are achieved according to the present invention by providing apparatus for the biological treatment of waste water by the activated sludge process comprising: an aerating chamber including means for aerating liquid therein, inlet means for introducing raw water into said aerating chamber, means for circulating liquid in a flow path in said aerating chamber, a clarifying chamber for receiving aerated liquid from said aerating chamber for separation of sludge therefrom, conduit means for conveying aerated liquid from said aerating chamber to said clarifying chamber, conduit means for conveying sludge separated from aerated liquid introduced into said clarifying chamber into said aerating chamber and positioned to introduce said sludge into said flow path in said aerating chamber in a direction substantially the same as the direction of motion of liquid circulating in said flow path, and outlet means for discharging clarified water from said clarifying chamber. Raw water is treated according to the invention by a process which comprises introducing raw water into an aerating zone, circulating liquid in said aerating zone in a flow path to aerate said liquid, conveying aerated liquid from said aerating zone into a separate clarifying zone, holding aerated liquid in said clarifying zone to permit sludge to settle therefrom whereby a clarified liquid is provided in the upper portion of said zone, conveying sludge settled from said aerated liquid in said settling zone into said flow path in said aerating zone in a direction substantially the same as the direction of motion of said liquid circulating in said flow path, removing sludge from said aerating zone, and removing clarified liquid from said clarifying zone.

DETAILED DESCRIPTION OF PREFERRED EMBODIMENTS

In the process according to the invention clarification may be achieved in the following way: the sludge water mixture in the aeration tank passing by the inlet of the return sludge is made to approximate the flow direction of the return sludge which has a downward trend, and the sludge water mixture is fed from the aeration tank into the secondary, or clarifying, tank outside the range of the flow passages for the return sludge. This method results in a two fold advantage: A) a counterflow in the sludge return passages is avoided, these passages only serving for an efficient sludge return. Sludge return flow can even be increased by making the current at the inlet of the return sludge so strong that a suction is caused at the inlet in the aeration tank. Further, the sludge return flow can be enhanced by causing the water level in the secondary tank to exceed that in the aeration tank. B) Since the sludge-water mixture entering the secondary tank does not necessarily follow a vertically rising flow path, it is possible to introduce the sludge-water mixture at the upper portion of the secondary tank and to establish an essentially horizontal flow path in longitudinal direction throughout the secondary tank. This horizontal flow tends to favor the sludge sedimentation, and it also facilitates the disposal of floating debris.

A preferred plant, in particular a compact waste water treatment plant for a process according to a preferred embodiment of the invention, is equipped with at least one collecting channel arranged within the splashing range of the surface aerator and above the liquid level of the aeration tank. The collecting channel discharges into the secondary tank at a location opposite the clean water outlet in such a way as to establish a horizontal flow in the tank. This is a simple way of conveying the sludge-water mixture into the secondary tank without auxiliary conveying means and without using the sludge return passages. At the same time, the desired horizontal flow is established in the secondary tank.

As a further development of the present invention, the sludge return can be facilitated by equipping the aerating tank with circulation means generating a vertical circulation, and by arranging the sludge return passages in such a way that the influx of the return sludge at least approximates the general direction of flow prevailing at the inlet within the aeration tank. In particular, the circulation flow can be generated by a surface aerator constructed, as essentially known, in the form of a rotor with a horizontal axis. The sludge is fed into the aeration tank preferably within the range of a downward current. By establishing a sufficiently strong circulation in the aeration tank, a suction can be achieved which draws the return sludge off the secondary tank and into the aeration tank. This suction can be further increased by the installation of baffle means in the aeration tank.

The collecting channel is preferably so disposed that it can collect a sufficient amount of water thrust up by the rotor, so the water level in the secondary tank is raised beyond that in the aeration tank. Thus the higher hydrostatic pressure achieved in the secondary tank favors the discharge of return sludge into the aeration tank.

The following measures influencing the flow system may further improve sedimentation of sludge and return of sludge: the partition between aeration tank and secondary tank can be so inclined such that the cross section of the secondary tank tapers inwardly towards the bottom and such that the horizontal flow generated in the aeration tank by the surface aerator is downwardly deflected by the partition. The return sludge passages are preferably made to taper inwardly with the direction of flow and their cross section can be so designed that the effluent velocity of the return sludge exceeds the rising velocity of air bubbles. In a preferred embodiment of simple design, the secondary tank, in top view, has a rectangular or square shape and a flow pattern running parallel to the partition between the secondary tank and the aeration tank.

The sludge-water mixture should enter the secondary tank as smoothly and steadily as possible and without causing undesirable turbulence. It is therefore preferable to arrange the discharge from the collecting channel into the secondary tank over the entire length of one side of the secondary tank and in particular so as to allow a control of the discharge by sections.

Furthermore, the water discharge from the collecting channel into the secondary tank is preferably directed outward against the tank wall. Similar principles apply to the discharge of clarified liquid from the secondary tank. For instance, the discharge can be effected via a height-adjustable overflow weir and in particular, such weir can be provided along the entire length of one side of the secondary tank. The clarified liquid outlet is preferably provided on the downstream side of a baffle means for retaining scum and floating debris within the clarifying tank.

The amount of water discharged into the secondary tank is preferably controlled in the following way: the collecting channel is equipped with a bypass leading back into the aeration tank and with a flap or similar means controlling the proportion of the water volume entering the aeration tank and the secondary tank respectively. Also, the collecting channel can be made adjustable in the vicinity of the surface aerator either as to its height, as to its effective length and/or as to its distance relative to the surface aerator.

The horizontal flow pattern within the secondary tank facilitates the disposal of floating debris. As a further development of the invention, therefore, a scum disposal means may be arranged in the secondary tank, in particular in the vicinity of the inlet. The scum disposal means is so arranged as to discharge into the suction zone of the flow prevailing in the aeration tank. The inlet opening of the scum disposal means is preferably floating and is fitted with a sieve.

In case of a deficiency of the surface aerator or similar trouble, sludge from the aeration tank may return through the bottom passages into the secondary tank. In order to prevent this, said passages preferably are provided with check valves.

Since the sludge return rate which can be achieved with a system according to the invention is especially high, the disposal of surplus sludge is of great importance. As a further development of the invention, the system is equipped with a sludge collecting tank. Surplus sludge from the bottom of the aeration tank is lifted hydrostatically by means of a siphon which preferably works intermittently, aeration and circulation being shut off at some earlier time.

There follows a detailed description of a preferred embodiment of the present invention, together with accompanying drawings. However, it is to be understood that the detailed description and the accompanying drawings are provided solely for the purpose of illustrating a preferred embodiment, and that the invention is capable of numerous modifications and variations apparent to those skilled in the art without departing from the spirit and scope of the invention.

Figure 1:
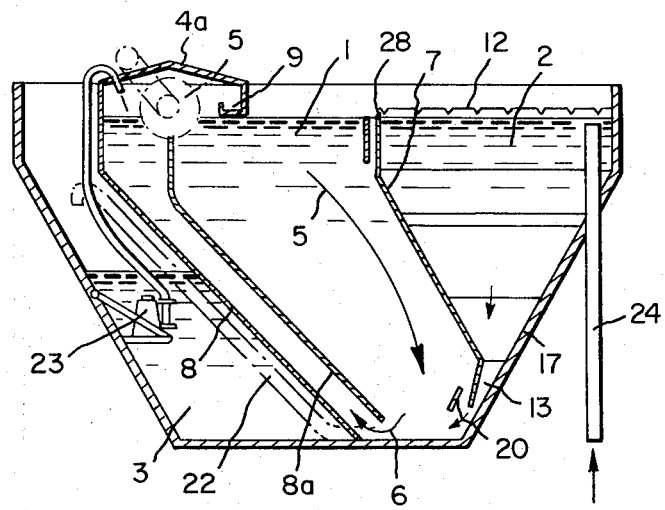
FIG. 1 is a longitudinal section through a compact waste water treatment plant according to the invention taken along line 1—1 of FIG. 2.

The apparatus shown in the drawings comprises the aeration chamber 1, the clarifying chamber 2 and a sludge collecting chamber 3. These three zones are contained in a single unit of either stationary or portable design and are separated by partitions within the unit.

The aeration chamber 1 is provided with a surface aerator comprising a rotor 4 which revolves about a horizontal axis and which is equipped with aeration shovels or similar elements which introduce air into the water and throw up part of the water. Rotor 4 generates a vertical circulation of flow within the aeration chamber 1 and the flow direction is indicated by arrows 5,6 in FIG. 1. The formation of this flow is favored by suitable inclination of the partition 7 between aeration chamber and clarifying chamber and of the partition 8 between aeration chamber 1 and sludge collecting chamber 3. This flow is also favored by installation of a flow baffle 8a almost parallel to the partition 8 whereby the ascending part of the circulation flow is separated from the descending part and returned into the suction of the rotor 4.

Figure 2:
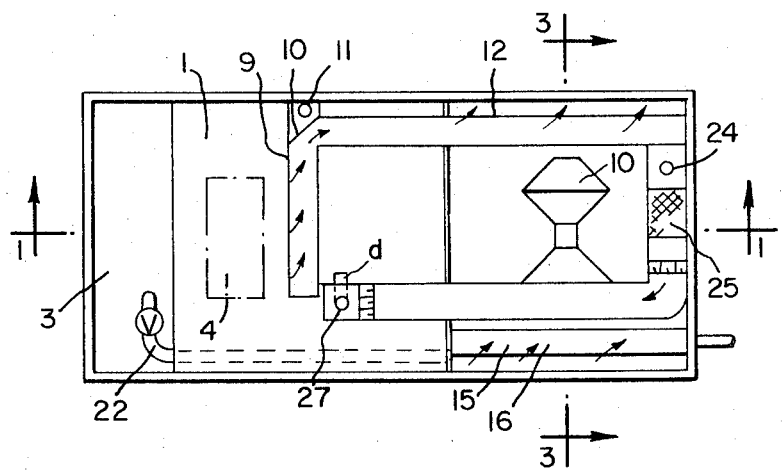
FIG. 2 is a diagrammatic top view of a compact waste water treatment plant according to the invention.
Figure 3:
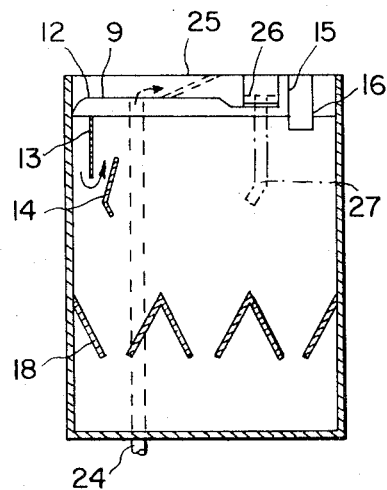
FIG. 3 is a section along line 3—3 of FIG. 2.

Above the water level, a collecting channel 9 is arranged immediately in front of rotor 4 and within its splash range. This channel collects a portion of the sludge-water mixture thrown up by rotor 4. A baffle 4a serves to prevent the liquid from being splashed out of the aerating chamber. In order to control the amount of water conveyed in channel 9, the collecting channel 9 can either be made adjustable as to its height, as to its effective length and/or as to its distance relative to the rotor. Furthermore, it is equipped with a bypass 11 which can be closed by a flap 10 and through which part of the water can be returned into the aeration tank. The collecting channel 9 is extended over the secondary tank 2 and is fitted with an overflow weir 12 located on the side of the channel turned towards the wall of the clarifying chamber, thus the water can enter the clarifying chamber over the entire length of this side. A baffle means 13 (FIG. 3) and a deflecting means 14 (FIG. 3) are provided to favor a quiet flow. The water deflected towards the surface by deflecting means 14, flows through the clarifying chamber following a smooth horizontal path which in the device shown in FIG. 2 is descending. On the opposite side of the clarifying chamber there is a clean water collecting channel 15 the overflow-type inlet 16 of which is also arranged on the side facing a wall of the clarifying chamber remote from inlet channel 9. The body of the collecting channel 15 is designed as a baffle means to retain floating debris.

The sludge flocs of the sludge-water mixture leaving the aeration tank and entering the secondary tank settle at the bottom of the secondary tank and this sedimentation is not interfered with by any ascending flow. The aforementioned inclination of the partition 7 and a corresponding inclination of the outer wall 17 reduce the longitudinal section of the secondary tank towards the bottom to a hopper-type shape. Inclined deflecting means 18 (FIG. 3) additionally reduce the cross section resulting in a number of hoppers the narrow outlet ends 19 of which are in direct communication with the aeration tank 1. As can be seen in FIG. 1, these sludge return openings are so designed that the sludge entering the aeration tank adopts the same direction of flow as the flow path of liquid being circulated in the aerating chamber by rotor 4 passing by this place. Thus the return sludge may be exposed to a suction effect not unlike that of a water-jet pump. This suction may be further increased by a deflecting plate 20 which concentrates the descending flow in the aeration tank and leads it away from the sludge inlet.

Figure 4:
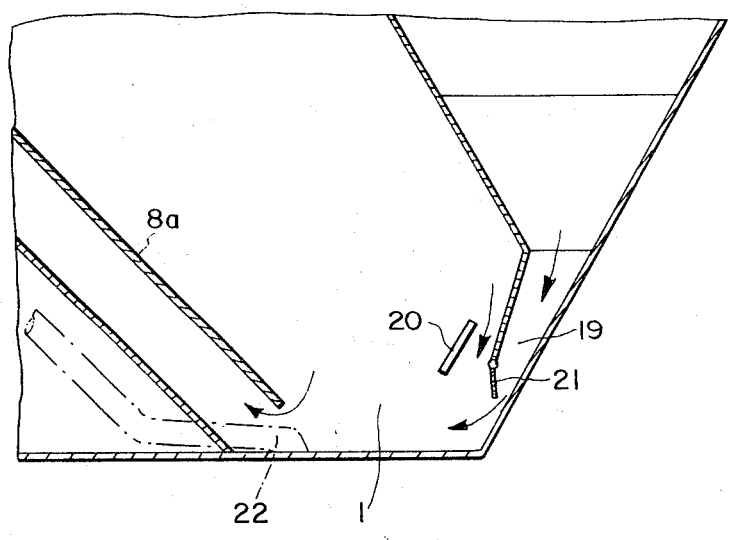
FIG. 4 is a scaleup section of a detail in the bottom area of the aeration and secondary tanks shown in FIGS. 1–3.

The guided water influx into the secondary tank causes the water level of the secondary tank to slightly exceed that of the aeration tank, thus the hydrostatic pressure also assists in forcing the sludge into the aeration chamber. The amount of return sludge can be controlled by a flap 21 (FIG. 4) which is preferably designed as a check valve to prevent the sludge from returning into the secondary tank if the pressure should be reversed.

A sludge withdrawal pipe 22 is disposed near the bottom of the clarifying chamber and the aeration chamber. This withdrawal pipe 22 intermittently withdraws excess sludge from the described system, preferably after prolonged idle periods of the rotor, and conveys it to a sludge collecting chamber 3. Here the sludge is left to settle again. A pump 23 feeds the liquid matter back into the aeration tank, whereas the more concentrated sludge is pumped onto drying beds by any conventional pumping means, not shown.

The system works as follows: the raw water passes through a pipe 24 into a channel which, being equipped with a bar screen 25 and a grit collector 26, for space reasons is located above the clarifying zone. An immersion feed pipe 27 introduces the water into the aeration zone. The arriving water gets into the aeration and circulation zone of the rotor 4 and is circulated repeatedly within the aeration zone. Only a small part of the sludge-water mixture is thrown by the rotor into the collecting channel 9 and reaches the clarifying zone 2. Here a slight horizontal flow is prevailing which is minimized by the design of inlet and outlet. The clean water leaves the tank through outlet 15, whereas the settled sludge passes into the aeration tank through passages 19 and thus returns into the activation process from whence it is ultimately removed through sludge withdrawal pipe 22 into the sludge collecting tank 3.

Floating debris is withdrawn from the clarifying zone by a scum disposal means (not shown) which is arranged on the upstream side of the combination baffle plate-inlet channel 15 since, because of the horizontal flow, floating debris will collect on this side. The scum disposal means comprises a drain pipe with a preferably floating, sieve-type inlet which retains coarse material. The sieve basket can be detached and the coarse matter removed from time to time.

The entire system can either be designed as a stationary or portable unit. Except for the power requirements of the rotor 4 and an occasional pumping of surplus sludge, the unit does not need any power supply.

The partition between the aeration and clarifying chambers has an opening at approximately 30 cm., below water level. This opening can be closed by a hand gate which should be opened in case of prolonged power failure. Thus the water entering the aeration chamber may pass through this opening into the clarifying chamber and towards the outlet, and the entire unit then serves as a settling tank. The arrangement of this opening below water level leaves enough space for the floating debris entering with the raw water to collect on the surface of the aeration tank.

If the compact treatment plant is designed as a portable unit, it is possible to construct the unit according to the mechanical assembly technique, i.e., different sizes can easily be assembled by insertion of simple intermediate members. Thus, the unit consisting of the aeration tank 1, the clarifying tank 2 and the sludge collecting tank 3, can be divided along line 1—1 of FIG. 2. The two halves obtained by this division being the two basic parts can either be directly assembled, or by insertion of simple wall elements, can be enlarged to a unit of greater capacity. It is a particular advantage of this method that every part of the unit, i.e., clarifying tank, aeration tank and sludge collecting tank, are extended to about the same extent thus keeping their proportions relative to each other. Each insertion can be equipped with a section of an aeration means which has to be connected to the aeration rotor parts of the basic halves. Depending on the width of the inserted parts and on the resulting length, it may become necessary to provide at least one intermediate support of the rotor as well as one or several additional driving means.

What is claimed is:

1. Apparatus for the biological treatment of waste water by the activated sludge process comprising:
   an aerating chamber including means for aerating liquid therein;
   inlet means for introducing raw water into said aerating chamber;
   a clarifying chamber for receiving aerated liquid from said aerating chamber for separation of sludge therefrom, said clarifying chamber including a peripheral wall;
   clarified liquid outlet means located adjacent the surface of the liquid in said clarifying chamber at said peripheral wall of said clarifying chamber for discharging clarified water from the surface of liquid in said clarifying chamber;
   aerated liquid inlet means located adjacent the surface of the liquid in said clarifying chamber at said peripheral wall of said clarifying chamber at a location remote from said clarified liquid outlet means for introducing aerated liquid into said clarifying chamber adjacent the surface of liquid therein whereby liquid introduced into said clarifying chamber is urged to flow horizontally across the upper portion of said clarifying chamber from said aerated liquid inlet towards said clarified liquid outlet;
   first conduit means for conveying aerated liquid from said aerating chamber to said aerated liquid inlet means of said clarifying chamber;
   second conduit means for conveying sludge separated from aerated liquid introduced into said clarifying chamber into said aerating chamber and positioned to introduce said sludge into said aerating chamber; and
   circulating means located at the surface of liquid in said aerating chamber for circulating liquid in a flow path in said aerating chamber, the flow in said aerating chamber being sufficient to draw sludge through said second conduit means into said aerating chamber, said sludge being introduced into said aerating chamber in a direction substantially the same as the direction of motion of liquid circulating in said flow path.

2. Apparatus according to claim 1 wherein said sludge conveying conduit means is positioned to introduce said sludge into said aerating chamber in a generally downward direction.

3. Apparatus according to claim 1 including means to maintain the water level in said clarifying chamber higher than in said aerating chamber.

4. Apparatus according to claim 1 including means for removing sludge from said apparatus.

5. Apparatus according to claim 4 wherein said sludge removal means comprises conduit means to convey sludge from the bottom of said aeration chamber to a collecting chamber.

6. Apparatus according to claim 1 wherein said aerating means comprises a surface aerator, and wherein said aerated liquid conveying means comprises a channel disposed within the splash range of said surface aerator above the liquid level of said aerating chamber.

7. Apparatus according to claim 6 wherein said circulating means comprises said surface aerator.

8. Apparatus according to claim 1 comprising a unitary structure including said aerating chamber and said clarifying chamber and including a wall separating said chambers, said wall being inclined such that the cross-sectional area of said clarifying chamber tapers inward downwardly.

9. Apparatus according to claim 1 wherein the cross-sectional area of said sludge conveying conduit means tapers inwardly in the flow direction.

10. Apparatus according to claim 8 wherein the unit comprises two basic units, each unit comprising that portion of the apparatus lying on one side of a plane substantially vertical to said wall, said units being secured together to form said chambers.

11. Apparatus according to claim 10 including additional wall elements interposed between said units and forming with said units an aerating chamber and clarifying chamber of increased size.

12. A method of biologically treating waste water by an activated sludge process which comprises:
   introducing raw water into an aerating zone;
   circulating liquid at the surface of liquid in said aerating zone to aerate said liquid and to circulate the liquid in a flow path in said aerating zone;
   conveying aerated liquid from said aerating zone into a separate clarifying zone the aerated liquid being introduced adjacent the level of the liquid maintained in said clarifying zone;
   removing clarified liquid from said clarifying zone at a point adjacent the level of liquid maintained in said clarifying zone at a location remote from the introduction of aerated liquid thereto to induce a horizontal flow of liquid across said clarifying zone from the aerated liquid inlet to the clarified liquid outlet adjacent the level of the liquid in said clarifying zone;
   conveying sludge settled from said aerated liquid in said settling zone into said flow path in said aerating zone in a direction substantially the same as the direction of motion of said liquid circulating in said flow path; and
   removing sludge from said aerating zone.

* * * * *